US009644418B2

(12) United States Patent
Taki et al.

(10) Patent No.: US 9,644,418 B2
(45) Date of Patent: May 9, 2017

(54) MONEY STORAGE DEVICE AND MONEY STORAGE DEVICE MANAGING SYSTEM

(71) Applicants: Yoshihiko Taki, Chiyoda-ku (JP); Shigehisa Omatsu, Asahi (JP)

(72) Inventors: Yoshihiko Taki, Chiyoda-ku (JP); Shigehisa Omatsu, Asahi (JP)

( * ) Notice: Subject to any disclaimer, the term of this patent is extended or adjusted under 35 U.S.C. 154(b) by 0 days.

(21) Appl. No.: 14/426,785

(22) PCT Filed: Jun. 24, 2013

(86) PCT No.: PCT/JP2013/003936

§ 371 (c)(1),
(2) Date: Mar. 9, 2015

(87) PCT Pub. No.: WO2014/041727

PCT Pub. Date: Mar. 20, 2014

(65) Prior Publication Data

US 2015/0225992 A1 Aug. 13, 2015

(30) Foreign Application Priority Data

Sep. 13, 2012 (JP) ................................ 2012-201997

(51) Int. Cl.
*B60R 25/00* (2013.01)
*E05G 1/00* (2006.01)
(Continued)

(52) U.S. Cl.
CPC .......... *E05G 1/005* (2013.01); *E05B 63/0065* (2013.01); *E05B 65/0075* (2013.01); *E05G 1/00* (2013.01); *E05G 1/04* (2013.01); *E05G 1/10* (2013.01); *G07C 9/00571* (2013.01); *G07D 11/0006* (2013.01); *E05B 2047/0048* (2013.01);
(Continued)

(58) Field of Classification Search
None
See application file for complete search history.

(56) References Cited

U.S. PATENT DOCUMENTS

| | | | | |
|---|---|---|---|---|
| 5,907,286 A * | 5/1999 | Kuma | ................ | G07C 9/00142 235/379 |
| 2010/0059587 A1* | 3/2010 | Miller | ................ | G06Q 20/1085 235/379 |

FOREIGN PATENT DOCUMENTS

| | | |
|---|---|---|
| JP | 2003-184431 | 7/2003 |
| JP | 3433855 | 8/2003 |
| JP | 2004-062597 | 2/2004 |

OTHER PUBLICATIONS

International Search Report from Japan for PCT/JP2013/003936 mailed on Sep. 24, 2013.

(Continued)

*Primary Examiner* — Nabil Syed
*Assistant Examiner* — Thomas McCormack
(74) *Attorney, Agent, or Firm* — Greenblum & Bernstein, P.L.C.

(57) ABSTRACT

To further strengthen the security function of a money storage device, a money storage device which stores collected money is configured to: receive a locked state releasing instruction signal that instructs releasing of a locked state, from a money storage device managing server which manages the money storage device, via a communication network and a repeater by using wireless communication; and release the locked state in response to the reception of the locked state releasing instruction signal.

6 Claims, 11 Drawing Sheets

(51) Int. Cl.

| | |
|---|---|
| ***G07D 11/00*** | (2006.01) |
| ***E05B 63/00*** | (2006.01) |
| ***E05B 65/00*** | (2006.01) |
| ***E05G 1/04*** | (2006.01) |
| ***E05G 1/10*** | (2006.01) |
| *E05F 15/77* | (2015.01) |
| *E05B 47/00* | (2006.01) |
| *G07C 9/00* | (2006.01) |

(52) U.S. Cl.
CPC ....... *E05B 2047/0072* (2013.01); *E05F 15/77* (2015.01); *G07C 9/00912* (2013.01)

(56) References Cited

OTHER PUBLICATIONS

Japanese Office Action issued for Japanease Application No. 2012-201997 mailed on Sep. 13, 2016 along with an English-language translation thereof.

* cited by examiner

Fig .4

CUSTOMER POSSESSED
POINT INFORMATION

| CUSTOMER NAME | CUSTOMER ID | CUSTOMER POSSESSED POINTS |
| --- | --- | --- |
| X | 123456 | 320 |
| Y | 23457 | 6050 |
| Z | 77553 | 21 |
| ⋮ | ⋮ | ⋮ |

Fig .5

MONEY STORAGE DEVICE
MANAGING INFORMATION

| MONEY STORAGE DEVICE NAME | STATE |
| --- | --- |
| A | LOCKED |
| B | LOCKED |
| ⋮ | ⋮ |
| C | UNLOCKED |

Fig .6

PAYING-IN MANAGING INFORMATION

| DATE AND HOUR OF PAYING-IN | CUSTOMER ID | AMOUNT OF PAYING-IN |
|---|---|---|
| 2012/6/15 12:35 | 1233456 | 1000 |
| 2012/6/16 13:12 | 23457 | 1000 |
| 2012/6/17 13:14 | 23457 | 1000 |
| 2012/6/18 13:58 | 77553 | 10000 |
| ⋮ | ⋮ | ⋮ |

Fig .7

CUSTOMER ID MANAGING INFORMATION

| CUSTOMER NAME | CUSTOMER ID |
|---|---|
| X | 123456 |
| Y | 23457 |
| Z | 77553 |
| ⋮ | ⋮ |

Fig .11

CUSTOMER POSSESSED
POINT INFORMATION

| CUSTOMER NAME | CUSTOMER ID | CUSTOMER POSSESSED POINTS |
|---|---|---|
| X | 123456 | 1320 |
| Y | 23457 | 8050 |
| Z | 77553 | 10021 |
| ⋮ | ⋮ | ⋮ |

MONEY STORAGE DEVICE AND MONEY STORAGE DEVICE MANAGING SYSTEM

CROSS REFERENCE TO RELATED APPLICATIONS

The present application is a U.S. national phase application under 35 U.S.C. §371 of PCT Application No. PCT/JP2013/003936, filed on Jun. 24, 2013, and claims priority to and incorporates by reference Japanese Patent Application No. 2012-201997, filed on Sep. 13, 2012.

TECHNICAL FIELD

The present invention relates to a technique for unlocking a safe which stores money collected from customers.

BACKGROUND ART

From the past, money storage devices for collecting cash have been used. For example, there is a money storage device including a GPS information reception means configured to receive GPS information and a recording means configured to store a data log concerning money stored in the money storage device, the money storage device transmits the GPS information and the data log to a monitoring device installed in a remote place. In this way, the money storage device is provided with a wireless function, and the own position of the money storage device and the amount of stored money can be identified from the remote place (e.g., refer to Patent Literature 1).

CITATION LIST

Patent Literature

Patent Literature 1: JP 2004-062597 A

SUMMARY OF INVENTION

Technical Problem

The conventional money storage device described above is configured to make it possible to identify the position and the amount of stored money from a remote place. However, a contrivance concerning unlocking and locking is not made. It becomes possible to unlock with ease depending on a decision of a person who handles the money storage device. As a result, there is a problem that the security function cannot be said to be sufficient.

An object of the present invention is to strengthen the security function of the money storage device in order to solve the above-described problem.

Solution to Problem

A money storage device according to the present invention is a money storage device that stores collected money. The money storage device includes a locked state releasing instruction signal reception means configured to receive a locked state releasing instruction signal, which instructs to release a locked state, from a money storage device managing server, which manages the money storage device, via a communication network by using wireless communication. In addition, the money storage device includes a locked state releasing means configured to release a locked state in response to reception of the locked state releasing instruction signal.

Owing to the above-described configuration, the security function of the money storage device can be further strengthened.

The money storage device may be configured to be portable. In addition, the money storage device may be configured to include an own position identification enabling information transmission means configured to transmit own position identification enabling information, which enables identification of an own position, to the money storage device managing server. In addition, the locked state releasing instruction signal reception means may be configured to receive the locked state releasing instruction signal, which is transmitted by the money storage device managing server when an own position of the money storage device identified by using the own position identification enabling information is included in a specific unlocking permission area.

The money storage device may be configured to include a customer information identification means configured to identify customer information, a money take-in means configured to take in money while discriminating a kind of money, and a point conversion means configured to convert an amount of money taken in by the money take-in means to points. In addition, the money storage device may be configured to include a paying-in managing information storage means configured to store paying-in managing information obtained by associating points converted by the point conversion means with customer information identified by the customer identification means. In addition, the money storage device may be configured to include a paying-in managing information transmission means configured to transmit the paying-in managing information to the money storage device managing server.

Furthermore, a money storage device managing system according to the present invention is a money storage device managing system including a money storage device configured to store collected money and a money storage device managing server configured to manage the money storage device. The money storage device includes a locked state releasing instruction signal reception means configured to receive a locked state releasing instruction signal, which instructs to release a locked state, from the money storage device managing server, via a communication network by using wireless communication. In addition, the money storage device includes a locked state releasing means configured to release a locked state in response to reception of the locked state releasing instruction signal. The money storage device managing server includes a locked state releasing instruction signal transmission means configured to transmit the locked state releasing instruction signal to the money storage device.

The money storage device managing server may be configured to include an unlocking permission area information storage means configured to store unlocking permission area information which indicates an unlocking permission area where unlocking the locked state is permitted. In addition, the money storage device managing server may be configured to include a determination means configured to determine whether the own position indicated by the own position identification enabling information transmitted by the own position identification enabling information transmission means is included in the unlocking permission area indicated by the unlocking permission area information. The locked state releasing instruction signal transmission means may be configured to transmit the locked state releasing instruction signal to the money storage device when the determination means has determined that the own position is included in the unlocking permission area.

Advantageous Effects of Invention

According to the present invention, the security function of the money storage device can be strengthened.

BRIEF DESCRIPTION OF DRAWINGS

FIG. 4 is an explanation diagram illustrating an example of a storage state of paying-in managing information.

FIG. 5 is an explanation diagram illustrating an example of a storage state of customer possessed point information.

FIG. 6 is an explanation diagram illustrating an example of a storage state of customer possessed point information.

FIG. 7 is an explanation diagram illustrating an example of a storage state of customer ID managing information.

FIG. 11 is an explanation diagram illustrating an example of a storage state of customer possessed point information after update.

DESCRIPTION OF EMBODIMENTS

Hereafter, embodiments of the present invention will be described with reference to the drawings.

Figure 1:
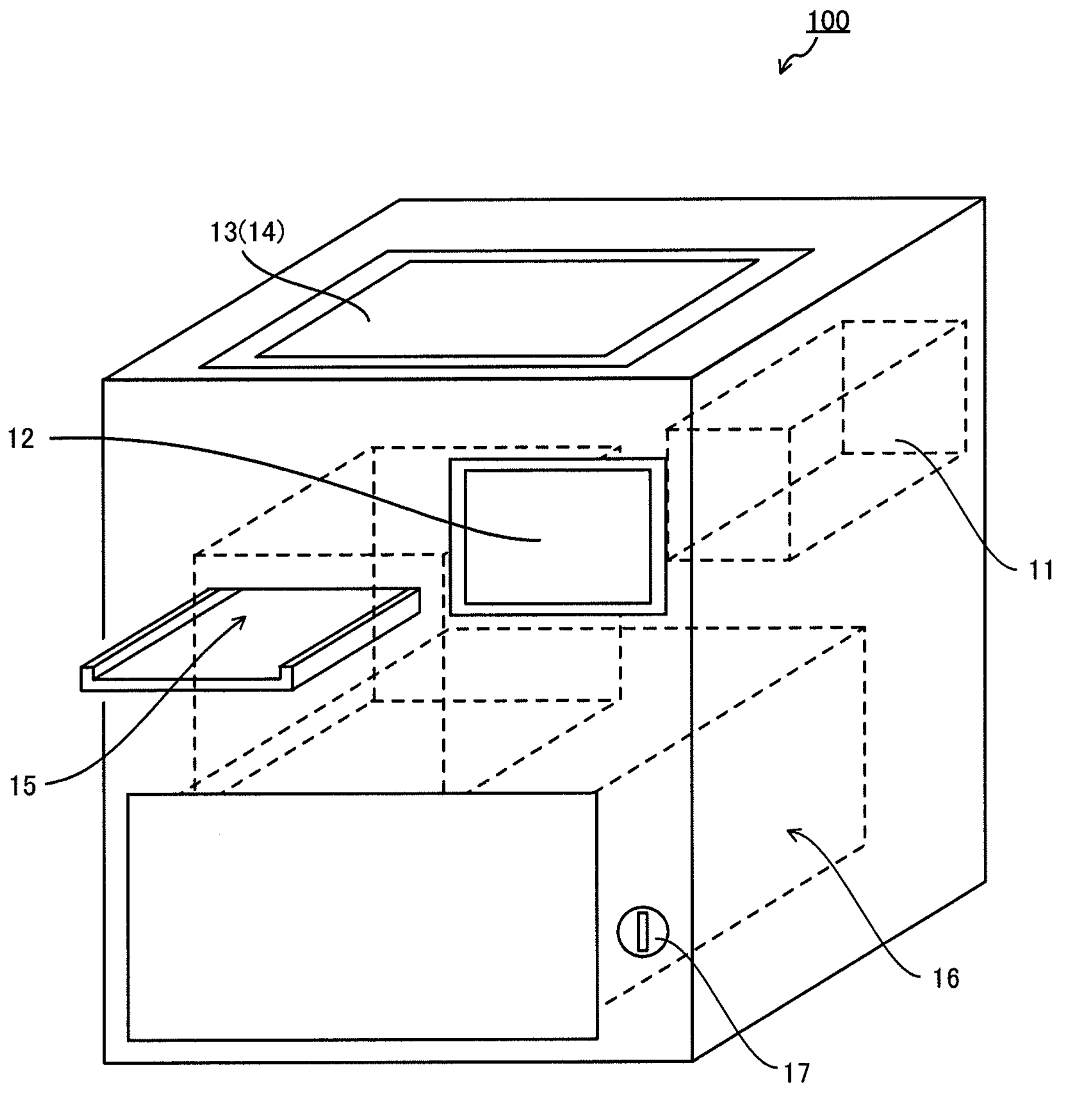
FIG. 1 is a simplified diagram illustrating a configuration example of a money storage device.
Figure 2:
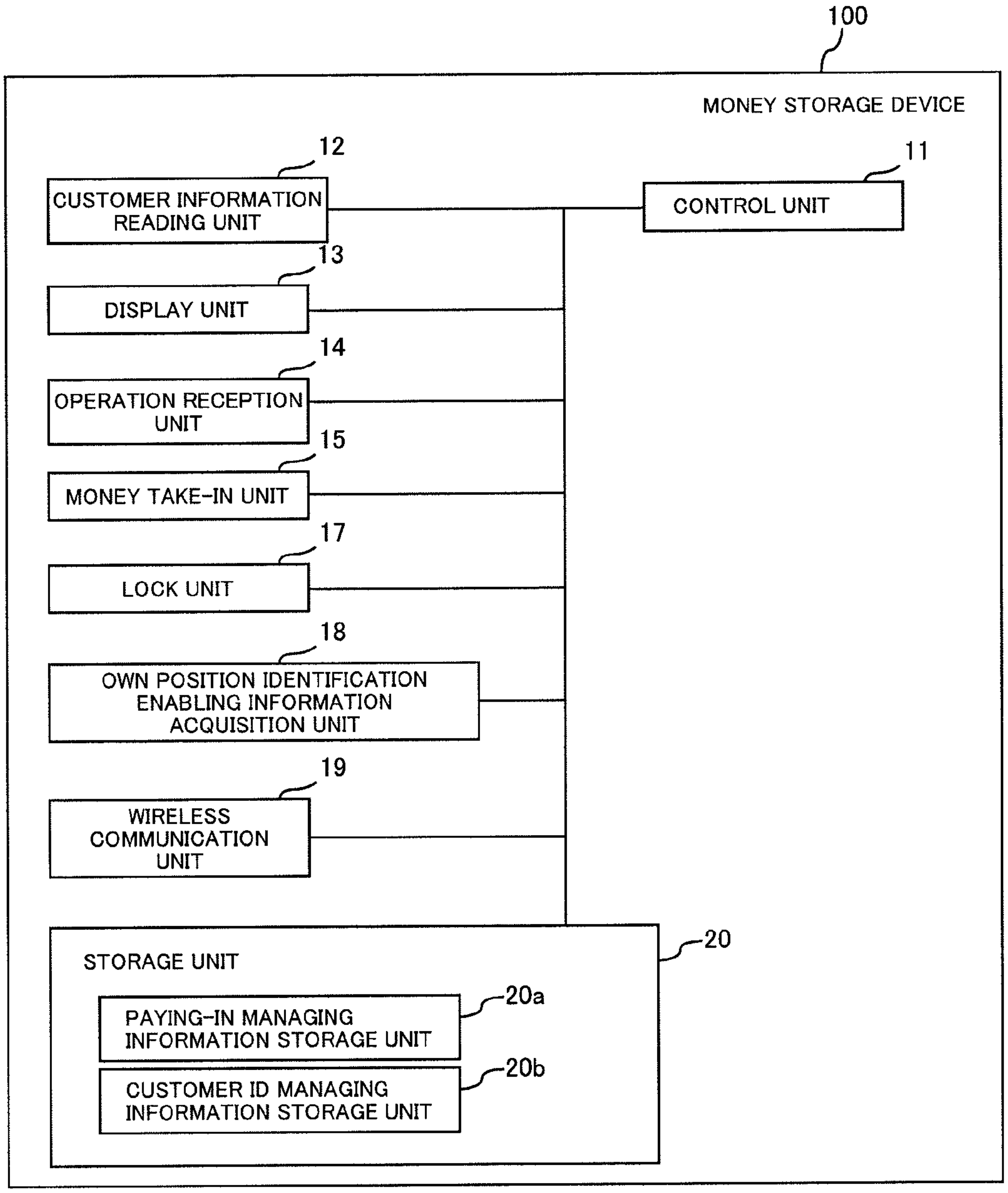
FIG. 2 is a block diagram illustrating a configuration example of a money storage device.

FIG. 1 is a simplified diagram illustrating a configuration example of a money storage device 100 in an embodiment of the present invention. FIG. 2 is a block diagram illustrating a configuration example of the money storage device 100.

As illustrated in FIG. 1 and FIG. 2, the money storage device 100 is configured to include a control unit 11, a customer information read unit 12, a display unit 13, an operation reception unit 14, a money take-in unit 15, a money storage unit 16, and a lock unit 17. The money storage device 100 is configured to further include an own position identification enabling information acquisition unit 18, a wireless communication unit 19, and a storage unit 20.

The money storage device 100 is configured to have a size and a weight that make the device portable when going the rounds of houses of customers interspersed in various places, or have a size and a weight that make the device mountable on a collection vehicle. The money storage device 100 is a portable type casing. In addition, the money storage device 100 is configured to be capable of being unlocked according to an instruction from a money storage device managing server 30.

The control unit 11 has a function of executing various kinds of control executed when storing and managing money.

Specifically, the control unit 11 conducts processing such as display processing of displaying information to a customer, totalization processing of money taken into the money storage device 100, and locked state releasing processing of releasing a locked state. Details of processing contents will be described in detail later.

The customer information read unit 12 is a card reader for reading a customer ID that uniquely determines a customer. Specifically, the customer information read unit 12 reads a customer ID from an IC chip or magnetism included in a pre-paid card, a membership card or the like. By the way, in the present example, a customer ID is read from a card having information that uniquely identifies a customer embedded therein. Alternatively, a configuration in which a discrimination number stored as a customer ID is input directly to an operation panel and the customer ID is read may be used. In other words, a configuration in which a customer ID is read by manual input may be used.

The display unit 13 is a liquid crystal display device that displays a confirmation screen concerning paying-in of money, operation buttons for conducting various operations, and the like in accordance with control of the control unit 11.

The operation reception unit 14 is a touch panel that receives an operation from a customer on the operation buttons displayed by the display unit 13. In the present example, a customer ID is read by causing the customer information read unit 12 to read out information embedded in a card. Alternatively, it is possible to use a configuration in which a customer ID is read by causing the display unit 13 to display a screen on which a number that identifies a customer can be input is displayed to the customer and causing the operation reception unit 14 to receive input of the number directly.

The money take-in unit 15 is a device that takes in money such as bills and coins received from a customer and discriminates kinds of money. The money take-in unit 15 is configured to include an external bill take-in slit projecting to the money storage device, and a bill take-in mechanism having a function of taking in bills inserted into the bill take-in slit. The money take-in unit 15 is further configured to include a coin take-in slit having a function of taking in coins, and a money discrimination mechanism having a function of discriminating kinds of bills and coins taken in. Devices having these functions have become already known techniques and consequently detailed description will be omitted.

Furthermore, the money take-in unit 15 is configured to be capable of being brought into a “lock state” in which bills and coins cannot be taken in. For example, a configuration in which power supplies of various functions such as the bill take-in mechanism and the money discrimination function are not turned on at the time of the “lock state” can be used. Processing of bringing the money take-in unit 15 into the lock state will be described in detail later. Specifically, the “lock state” and the “locked state” are closely related with each other. The money take-in unit 15 is configured not to be brought into the “lock state” at the time of the “locked state” and to be brought into the “lock state” at the time of the “locking released state.”

The money storage unit 16 is a casing that stores money taken in by the money take-in unit 15. The money storage unit 16 is configured to be capable of being taken out freely by using a take-out member such as a handle. However, the money storage unit 16 is configured not to be capable of being taking out in a state in which the money storage unit 16 is locked by the lock unit 17.

The lock unit 17 is a lock that controls taking out of the money storage unit 16. The lock unit 17 may include a plurality of locks. In the present example, the lock unit 17 includes two locks, i.e., an electronic lock unlocked by receiving a locked state releasing instruction signal as a "first lock" and a lock unlocked by inserting and turning a key as a "second lock." In the present example, the lock unit 17 includes an electronic lock (a first lock) and a keyhole type lock (a second lock). However, the lock unit 17 may have only a lock unlocked by receiving the locked state releasing instruction signal (first lock).

By the way, "locked state" in the present example refers to a state in which the electronic lock (the first lock) unlocked by receiving the locked state releasing instruction signal is locked. On the other hand, "unlocked state" refers to a state in which the electronic lock (the first lock) unlocked by receiving the locked state releasing instruction signal is unlocked. Furthermore, the electronic lock (the first lock) unlocked by receiving the locked state releasing instruction signal is locked by using various methods. For example, the configuration can be such a configuration having a switch for locking the electronic lock, or a configuration in which the electronic lock is locked automatically in response to locking a lock (second lock) unlocked by inserting and turning a key.

The own position identification enabling information acquisition unit 18 is a so-called GPS receiver. The own position identification enabling information acquisition unit 18 receives a GPS signal emitted from a GPS satellite, measures a distance (pseudo distance) between the GPS satellite and the GPS receiver itself, and identifies an own position of the GPS receiver itself (GPS positioning solution) by receiving GPS signals from a plurality of satellites simultaneously. In the present example, a configuration in which the GPS receiver acquires information that enables identification of the own position from a GPS signal is used. However, a configuration in which information that enables identification of current position information is obtained from an RFID tag may be used. Furthermore, it is possible to use a configuration in which the own position is not identified, but information that enables identification of the own position is acquired. In the configuration, the own position of the money storage device 100 is identified in a transmission destination (such as, for example, the money storage device managing server 30) to which the information that enables identification of the own position is transmitted.

The wireless communication unit 19 is a communication device which conducts communication with a repeater 50 connected to a communication network 40. In the present example, the wireless communication unit 19 is configured to conduct communication with the repeater 50. However, the wireless communication unit 19 may be configured to conduct giving and taking directly with the money storage device managing server 30 by being connected to the communication network without via a repeater.

The storage unit 20 is a storage medium that stores data required when storing and managing money. The storage unit 20 includes a nonvolatile memory such as, for example, a RAM. In the present example, a paying-in managing information storage unit 20*a* and a customer ID managing information storage unit 20*b* are included in the storage unit 20. The paying-in managing information storage unit 20*a* and the customer ID managing information storage unit 20*b* will be described in detail later.

Figure 3:
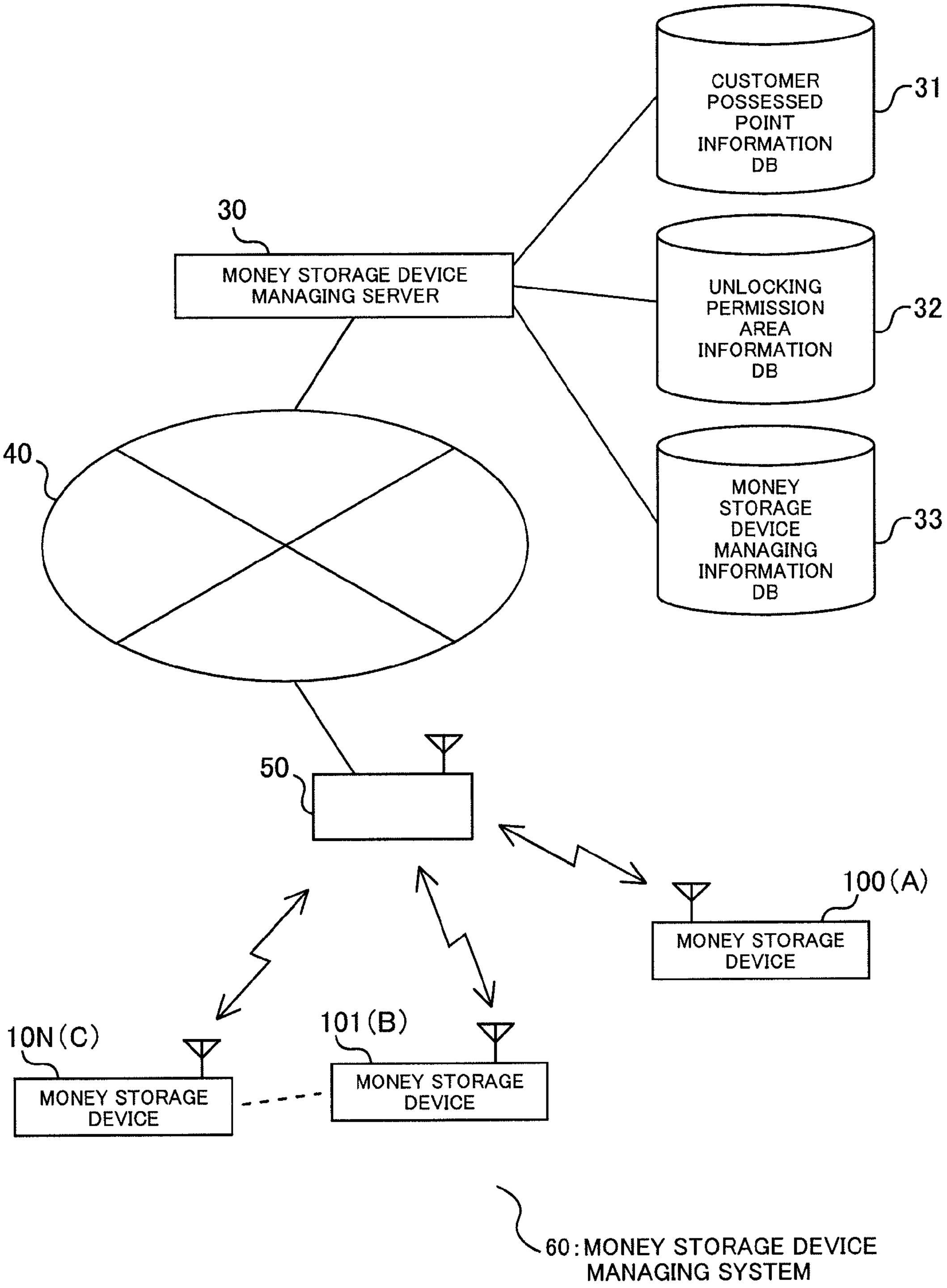
FIG. 3 is a block diagram illustrating a configuration example of a money storage device managing system.

FIG. 3 is a block diagram illustrating a configuration example of a money storage device managing system 60 according to an embodiment of the present invention. As illustrated in FIG. 3, the money storage device managing system 60 is a system including money storage devices 100 to 10N, a money storage device managing server 30, and a repeater 50.

The money storage device managing server 30 is connected to a communication network 40 such as, for example, a private line, a LAN, or a wireless communication line. The money storage device managing server 30 can communicate with the money storage devices 100 to 10N via the repeater 50.

The money storage device managing server 30 is a server device managed by, for example, a system manager of the money storage device managing system 60. The money storage device managing server 30 includes an ordinary information processing device having an OS (Operating System), middle ware, and various applications.

The money storage device managing server 30 has various functions such as a function of transmitting a signal that releases a locked state to the money storage devices 100 to 10N (where N is an arbitrary positive integer).

The money storage device managing server 30 has a customer possessed point information DB 31, an unlocking permission area information DB 32, and a money storage device managing information DB 33. The customer possessed point information DB 31, the unlocking permission area information DB 32, and the money storage device managing information DB 33 may be installed within the money storage device managing server 30 or may be installed outside the money storage device managing server 30.

The communication network 40 is a wireless communication means that connects the money storage device 100 to the money storage device managing server 30 by using a private line, a LAN, a wireless communication line, or the like. In an area where communication cannot be conducted because of deficiency of a base station or the like, a configuration having a wireless ad hoc network system may be used.

FIG. 4 is an explanation diagram illustrating an example of a storage state of customer possessed point information. As illustrated in FIG. 4, the customer possessed point information DB 31 stores customer possessed point information concerning the state of points of registered customers of the present system. Specifically, a customer name, a customer ID that indicates discrimination information of the customer, and customer possessed points are associated with each other and stored.

The customer ID is a discrimination number read by the customer information read unit 12. As the customer ID, for example, a discrimination number including a numeral of a predetermined number of digits to determine a customer uniquely is used. In the present example, a customer ID is used to identify a customer uniquely. However, identification of a customer is not restricted to a customer ID. A customer may be identified by using information, such as an address and a full name, concerning a customer.

The customer possessed points indicate the number of points possessed by a customer. The number of points is increased or decreased by use of points or charging (paying in) conducted by a customer.

The unlocking permission area information DB 32 stores unlocking permission area information in which an unlocking permission area where unlocking of a locked state is permitted is set. Specifically, the unlocking permission area is set to become a range having a width of some degree like “a range of a radius of . . . from a center position” or “ . . . in the east and west direction and . . . in the south and north direction.” In the present example, a permission area is set with a range of some degree. However, the permission area may be set in a pinpoint form without a width.

FIG. 5 is an explanation diagram illustrating an example of a storage state of money storage device managing information. As illustrated in FIG. 5, money storage device names (in the present example, A, B, C) for discriminating the money storage devices 100 to 10N are associated with states of the money storage devices 100 indicating whether the money storage devices 100 are in the locked state and stored in the money storage device managing information. In the present example, the states of the money storage devices 100 are recorded as “locked” when they are in the locked state, and recorded as “unlocked” when they are in the unlocked state.

FIG. 6 is an explanation diagram illustrating an example of a storage state of paying-in managing information. As illustrated in FIG. 6, the paying-in managing information is information in which date and hour of paying-in, a customer ID, and an amount of paying-in are associated with one another. Here, the date and hour of paying-in indicates date and hour when money is taken into the money take-in unit 15. The date and hour of paying-in is recorded in response to reception of paying-in from a customer conducted by the money take-in unit 15.

The amount of paying-in is an amount of money taken in by the money take-in unit 15. It is now supposed that a function of converting a part of money taken in by the money take-in unit 15 to points is provided by disposing a change unit to be able to eject change. In this case, an amount obtained by subtracting an amount ejected as change from an amount of money taken in by the money take-in unit 15 becomes the amount of paying-in.

FIG. 7 is an explanation diagram illustrating an example of a storage state of customer ID managing information. As illustrated in FIG. 7, the customer ID managing information is information in which an ID for identifying a customer uniquely and a full name of the customer are associated with each other. In the present example, only the full name of the customer is associated with the customer ID. However, various kinds of individual information such as an address and a telephone number of the customer may be associated with the customer ID and stored.

Figure 8:
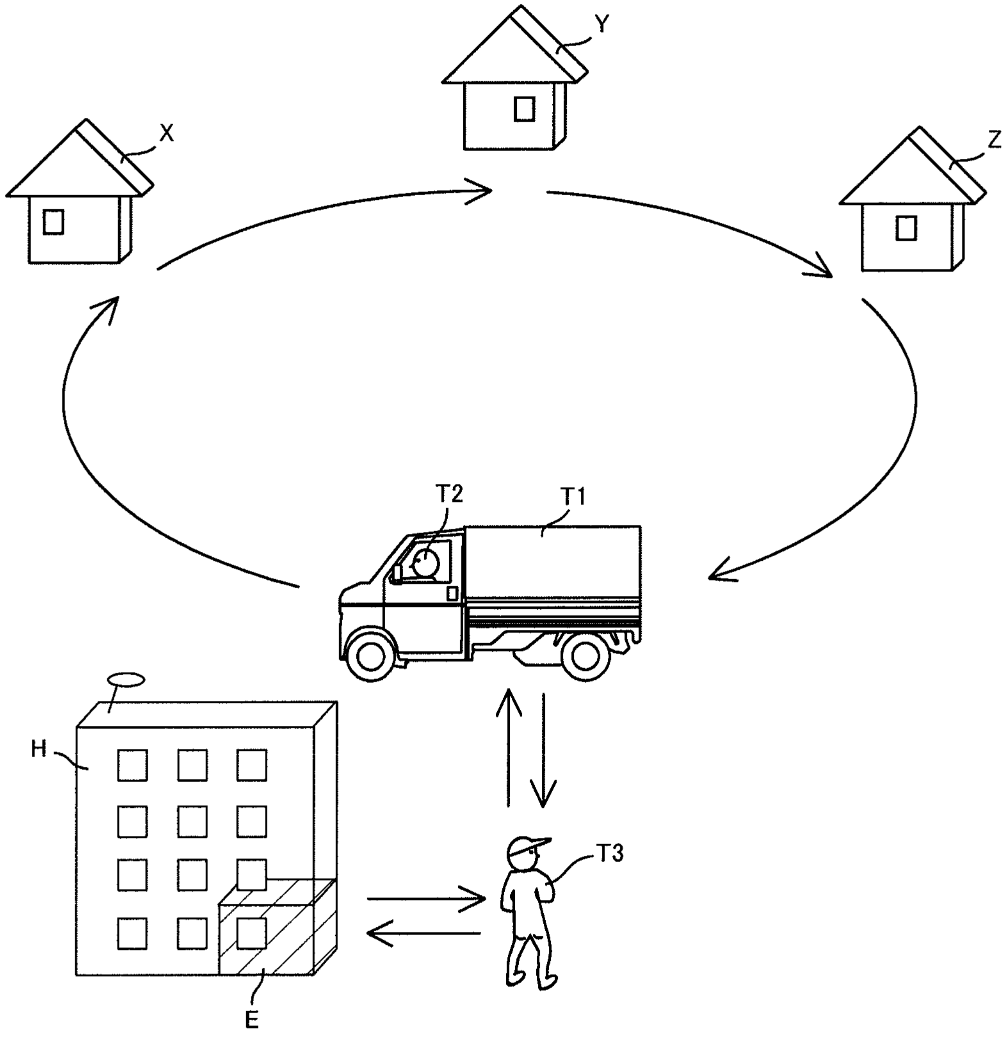
FIG. 8 is a concept diagram illustrating an example of an outline of a collection form to which the money storage device managing system in the present example is applied.

An example of an outline of a collection form to which the money storage device managing system 60 in the present example is applied will now be described. FIG. 8 is a concept diagram illustrating an example of an outline of a collection form to which the money storage device managing system 60 in the present example is applied.

As illustrated in FIG. 8, there are customers X, Y and Z who conduct paying-in, and a collecting person T2 who conducts collection of money by mounting the money storage device 100 on a collection vehicle T1 and going the rounds of houses of the customers X, Y and Z. In addition, there are a head office H that manages money collection generally, and a manager T3 of money on standby in the head office H. Furthermore, in the present example, an unlocking permission area E is set in a predetermined position within the head office H, and unlocking the locked state is permitted in the unlocking permission area E.

In the collection form to which the money storage device managing system 60 in the present example is applied, a person who collects money is different from a person who manages collected money. In other words, the collecting person T2 exists as the person who collects money and the manager T3 exists as the person who manages the collected money.

Furthermore, in the collection form to which the money storage device managing system 60 in the present example is applied, it is supposed that facilities concerning the communication network 40 are not fully equipped in the vicinities of residence places of the customers X, Y and Z. When collecting money, therefore, the money storage device 100 cannot communicate with the money storage device managing server 30 in the head office H. The money storage device 100 is brought into a state in which communication with the money storage device managing server 30 can be conducted by approaching the head office H.

First, the collecting person T2 receives the money storage device 100 from the manager T3 in the head office H, and goes the rounds of houses of customers X, Y and Z while carrying the money storage device 100.

The customers X, Y and Z respectively having customer IDs, each of which identifies a customer uniquely, registered into a server in the head office H conduct paying-in of money into the money storage device 100 carried by the collecting person T2 and convert money to points.

By the way, in the present example, facilities concerning the communication network 40 are not fully equipped in the vicinities of residence places of the customers X, Y and Z. Therefore, paying-in managing information concerning paying-in of a customer is stored into the money storage device 100 once and accumulated.

The collecting person T2 collects money, returns to the head office H in a state of memorizing information concerning paying-in, and delivers the money storage device 100 to the manager T3.

The manager T3 transmits paying-in managing information to the server in the head office H, which associates a customer ID identifying a customer uniquely with points possessed by the customer and stores a result, and adds points corresponding to the paying-in to points possessed by the customer.

Furthermore, the manager T3 carries the money storage device 100 to the unlocking permission area E, opens the money storage device 100, and withdraws money paid in by the customers X, Y and Z.

The present example is configured to prevent the collecting person T2 who collects money from touching the collected money as described above. By the way, in the present example, a configuration in which the paying-in managing information is stored in the money storage device 100 once is used because facilities concerning the communication network 40 are not fully equipped in the vicinities of residence places of the customers X, Y and Z. When facilities concerning the communication network 40 are fully equipped in the vicinities of residence places of the customers, however, the following configuration may be used. That is, paying-in managing information is not stored and accumulated in the money storage device 100, but paying-in managing information is transmitted to the money storage device managing server 30 on the spot where paying-in is conducted.

Operation in money collection processing according to an embodiment of the present invention will now be described with reference to the drawings. By the way, as for processing which is not especially related to the present invention, detailed description thereof will be omitted in some cases.

Figure 9:
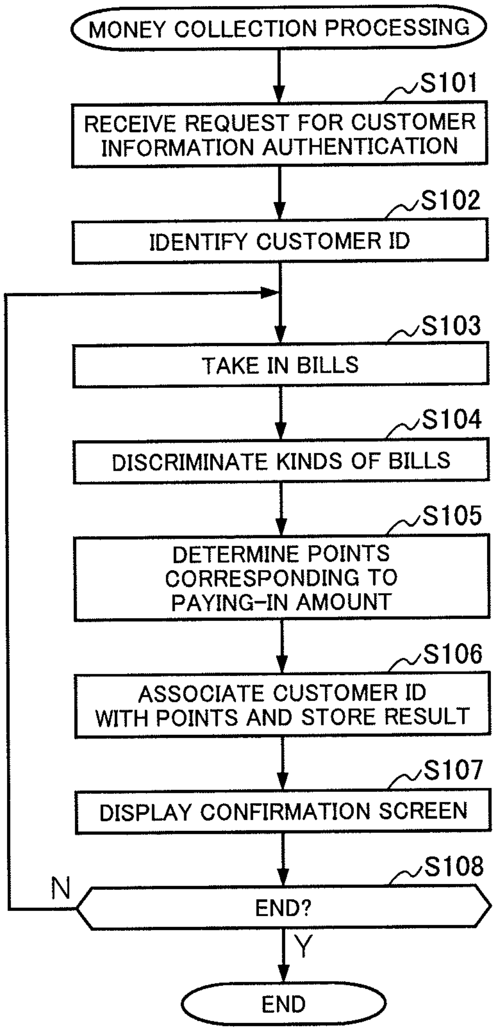
FIG. 9 is a flow chart illustrating an example of money collection processing.

FIG. 9 is a flow chart illustrating an example of money collection processing in which money is collected by using the money storage device 100. The money collection processing will be described by taking a case where the money storage device 100 receives paying-in of bills from a customer as an example.

In the money collection processing, the control unit 11 receives a request for customer authentication in response to reception of card presentation from a customer conducted by the customer information read unit 12 (step S101). Upon receiving the request for customer authentication, the control unit 11 conducts customer authentication on the basis of data embedded in the presented card, and identifies customer information (step S102).

If customer authentication is completed (Y in step S101) and a customer is identified, the money take-in unit 15 takes in bills inserted into the take-in slit by the customer, by using a money take-in mechanism (step S103).

Upon taking in the bills, the money take-in unit 15 discriminates kinds of bills taken in by the money take-in mechanism (step S104). In addition, the control unit 11 determines an amount of money paid into the money storage device 100.

Upon determining the amount of paying-in, the control unit 11 determines points corresponding to the paying-in amount (step S105).

Upon converting the paying-in amount to points, the control unit 11 associates the customer information (here, a customer ID) identified in step S102 with the points and stores a result in the storage unit 20 as paying-in managing information (step S106).

After the paying-in managing information is stored, the display unit 13 displays a confirmation screen to a customer on the basis of control from the control unit 11 (step S107). On the confirmation screen, customer information, the paying-in amount, and the number of points are displayed. By the way, when a customer desires cancel on the confirmation screen, a configuration in which paying-in managing information is erased after the cancel is determined may be used. Furthermore, in the same way, a configuration in which the confirmation screen is displayed to give a choice of cancel to the customer before storing the paying-in managing information in step S106 may be used.

Upon receiving an instruction of paying-in confirmation from the customer, the control unit 11 presents whether there is further paying-in of money to the customer (step S108). If paying-in of money is to be conducted (N in step S108), the processing returns to step S103 to make it possible to conduct paying-in consecutively while keeping the state in which the customer information has been identified.

On the other hand, when the control unit 11 has received a selection that consecutive paying-in of money will not be conducted from the customer, the money collection processing is finished. By the way, a configuration in which a receipt is issued when a selection that consecutive paying-in of money will not be conducted is received from the customer may be used.

Heretofore, an example of the money collection processing has been described. In the present example, the case where a customer pays in bills has been described as an example. However, a configuration in which money that can be taken in by the money storage device 100 includes coins may be used.

Furthermore, a configuration in which a part of money taken in is handled as an amount of paying-in by providing a charge unit may be used.

Furthermore, a configuration in which when converting a paying-in amount to points, point conversion with a point conversion rate taken into consideration is conducted by using a point conversion rate table (not illustrated) previously stored in the storage unit 20 may be used. A configuration in which timing of considering the point conversion rate is when paying-in managing information is transmitted to the money storage device managing server 30 may be used.

Operation of the money storage device managing system 60 concerning paying-in managing information according to an embodiment of the present invention will now be described with reference to the drawings. By the way, as for processing which is not especially related to the present invention, detailed description thereof will be omitted in some cases.

Figure 10:
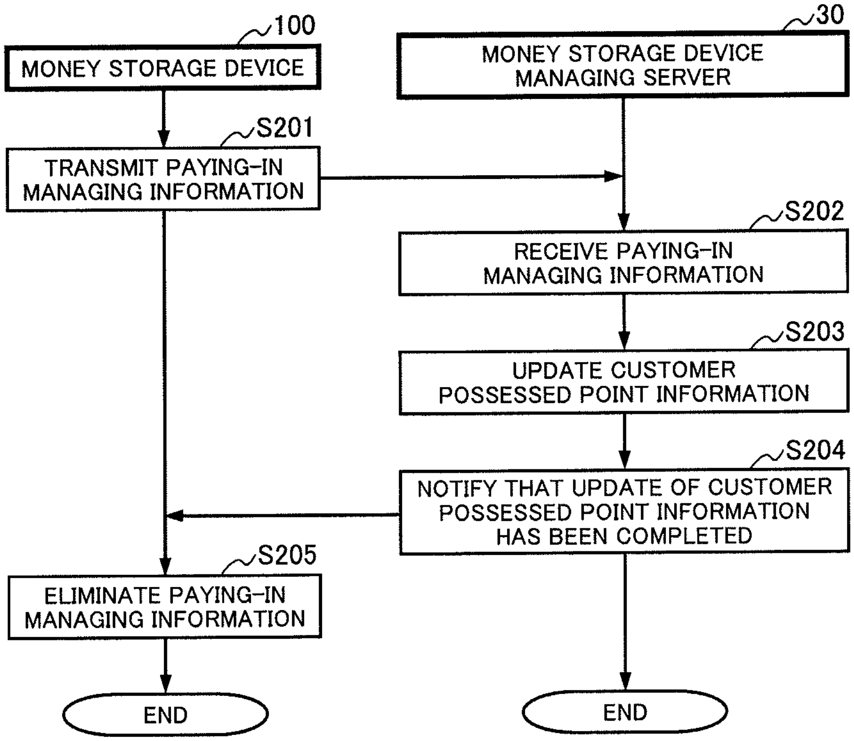
FIG. 10 is a flow chart illustrating an example of update processing of paying-in managing information.

FIG. 10 is a flow chart illustrating an example of update processing of paying-in managing information. Here, a case where customer possessed point information managed by the money storage device managing server 30 is updated by using paying-in managing information stored in the money storage device 100 will be described as an example.

In the money storage device managing system 60 concerning paying-in managing information, the money storage device 100 transmits paying-in managing information concerning money collected from a customer, to the money storage device managing server 30 (step S201).

The money storage device managing server 30 receives paying-in managing information transmitted by the money storage device 100 (step S202).

Upon receiving the paying-in managing information from the money storage device 100, the money storage device managing server 30 updates customer possessed point information on the basis of the paying-in managing information (step S203). Specifically, in the present example, the money storage device managing server 30 conducts processing of identifying the same customer ID as a customer ID stored in the paying-in managing information from among pieces of customer possessed point information and adding points corresponding to a paying-in amount to customer possessed points associated with the identified customer ID.

Upon updating customer information, the money storage device managing server 30 notifies the money storage device 100 that update of the customer possessed point information has been completed (step S204).

Upon receiving the update completion notice from the money storage device managing server 30, the money storage device 100 eliminates the paying-in managing information (step S205). In the present example, a configuration in which paying-in managing information is eliminated one by one in response to reflection to customer possessed point information is used. However, the configuration is not restrictive. A configuration in which paying-in managing information is associated with a reflection completion flag and stored in a state in which it can be distinguished whether information is completed in reflection may be used. According to such a configuration, it becomes unnecessary to eliminate paying-in managing information one by one. As a result, it becomes possible for the money storage device 100 to present a paying-in history to a customer.

FIG. 11 is an explanation diagram illustrating an example of a storage state of customer possessed point information after the customer possessed point information illustrated in FIG. 4 is updated on the basis of the paying-in managing information illustrated in FIG. 6. In the present example, "customer ID: 123456" pays in 1,000 yen in a state of having 320 points. As a result, the money storage device managing server 30 updates customer possessed point information to have 1,320 points. Furthermore, "customer ID: 23457" pays in 1,000 yen twice in a state of having 6,050 points. As a result, the money storage device managing server 30 updates customer possessed point information to have 8,050 points. In addition, "customer ID: 77553" pays in 10,000 yen in a state of having 21 points. As a result, the money storage device managing server 30 updates customer possessed point information to have 10,021 points.

An example of locked state releasing processing will now be described with reference to the drawings. By the way, as for processing which is not especially related to the present invention, detailed description thereof will be omitted in some cases.

Figure 12:
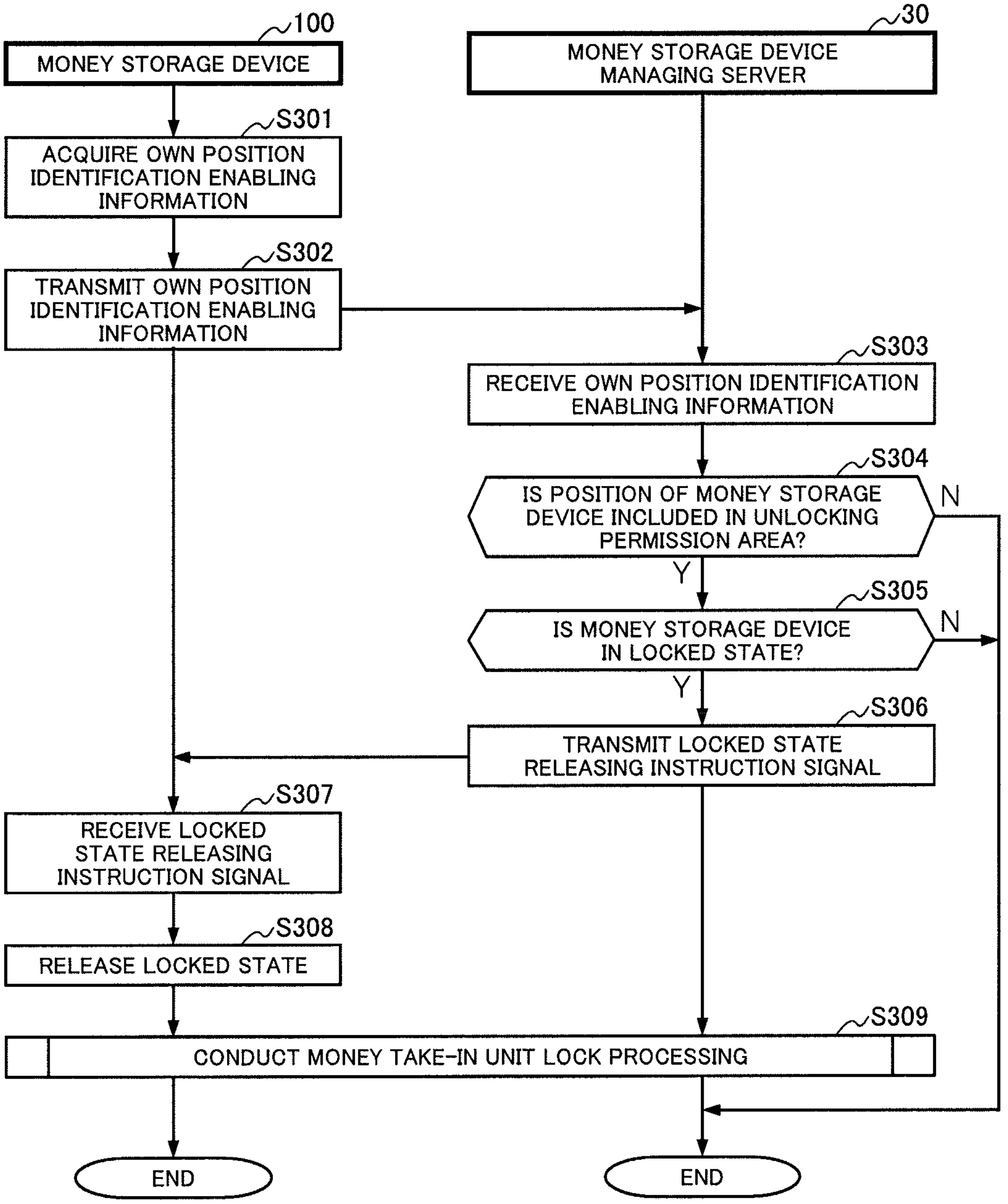
FIG. 12 is a flow chart illustrating an example of locked state releasing processing.

FIG. 12 is a flow chart illustrating an example of transmission processing of a locked state releasing instruction signal. Here, a case where the money storage device managing server 30 transmits a locked state releasing instruction signal in response to the own position of the money storage device 100 acquired by a GPS sensor will be described as an example.

In the money storage device managing system 60 concerning the locked state releasing instruction signal, the money storage device 100 acquires own position identification enabling information by using the GPS sensor (step S301).

Upon acquiring the own position identification enabling information, the money storage device 100 transmits the own position identification enabling information to the money storage device managing server 30 (step S302).

Upon receiving the own position identification enabling information from the money storage device 100 (step S303), the money storage device managing server 30 determines whether the own position indicated by the own position identification enabling information is included in the unlocking permission area by referring to the unlocking permission area information (step S304).

When the money storage device managing server 30 has determined that the own position of the money storage device 100 is not included in the unlocking permission area (N in step S304), the locked state releasing processing in the present example is finished.

On the other hand, when the money storage device managing server 30 has determined that the own position of the money storage device 100 is included in the unlocking permission area (Y in step S304), the money storage device managing server 30 conducts the following processing. That is, the money storage device managing server 30 determines whether the money storage device 100 that has transmitted the own position identification enabling information is in the locked state on the basis of the money storage device managing information stored in the money storage device managing information DB 33 (step S305).

When the money storage device managing server 30 has determined that the money storage device 100 is not in the locked state (N in step S305), the locked state releasing processing in the present example is finished.

On the other hand, when the money storage device managing server 30 has determined that the money storage device 100 is in the locked state (Y in step S305), the money storage device managing server 30 transmits the locked state releasing instruction signal to the money storage device 100 (step S306). Upon transmitting the locked state releasing instruction signal, the money storage device managing server 30 conducts money take-in unit lock processing (step S309).

Upon receiving the locked state releasing instruction signal from the money storage device managing server 30 (step S307), the money storage device 100 unlocks the electronic lock (the first lock) in the lock unit 17 (step S308). Upon unlocking the electronic lock in the lock unit 17, the money storage device 100 finishes the locked state releasing processing in the present example.

Heretofore, the locked state releasing processing in the present example has been described. In the locked state releasing processing in the present example described above, a configuration in which the locked state releasing instruction signal is transmitted by determining whether the money storage device 100 is in the locked state in step S305 is used. However, the money storage device managing server 30 may be configured to transmit the locked state releasing signal to the money storage device 100 whenever the own position of the money storage device 100 is determined to be included in the unlocking permission area (Y in step S304). At this time, it is not determined whether the money storage device 100 is in the locked state.

An example of the money take-in unit lock processing will now be described with reference to the drawings. By the way, as for processing which is not especially related to the present invention, detailed description thereof will be omitted in some cases.

Figure 13:
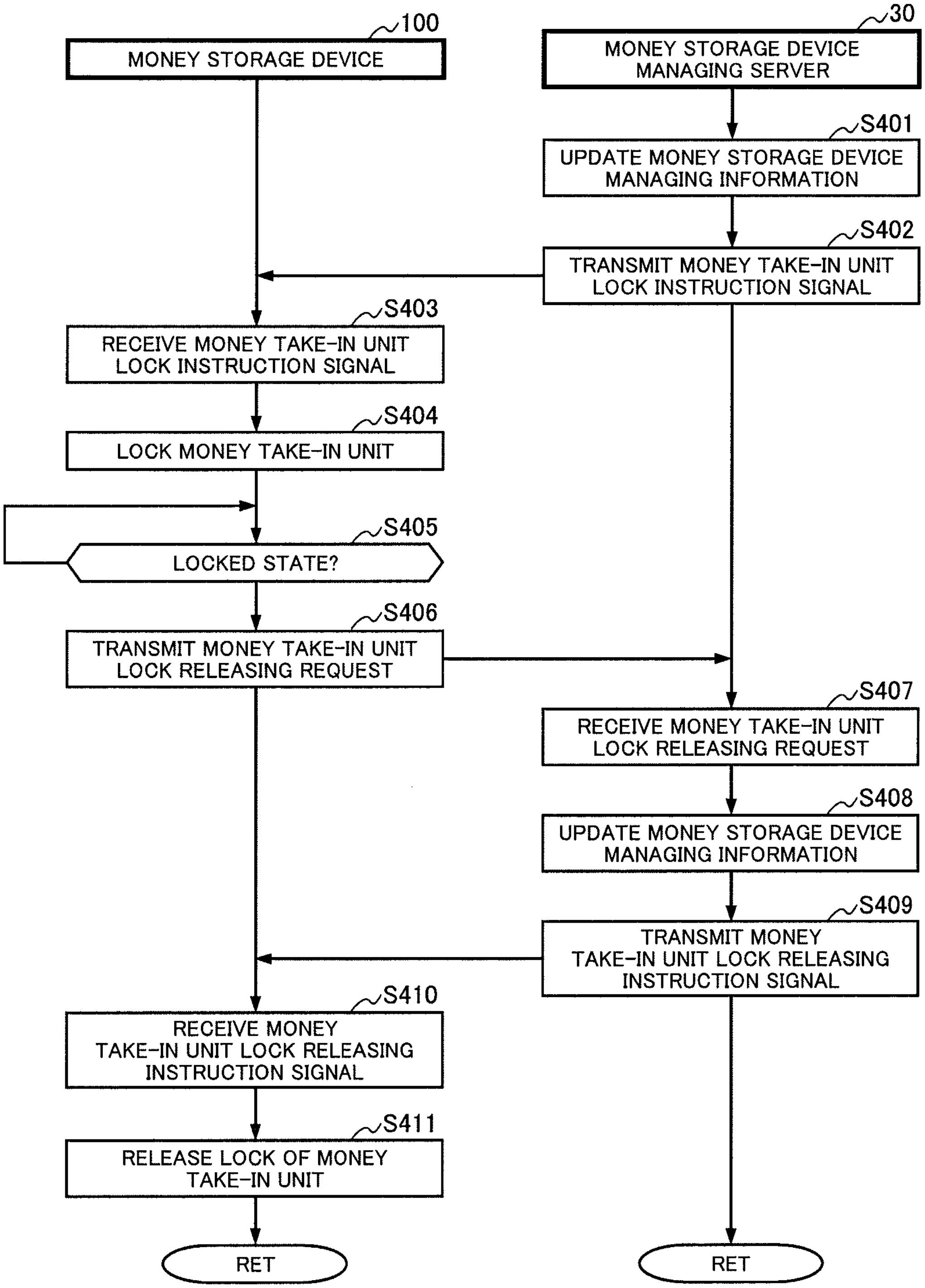
FIG. 13 is a flow chart illustrating an example of money take-in unit lock processing.

FIG. 13 is a flow chart illustrating an example of a money take-in unit lock processing. Here, a case where the money storage device is in the unlocked state by transmission of the locked state releasing instruction signal to the money storage device 100 conducted by the money storage device managing server 30 in step S306 of the money storage device 100 will be described as an example.

In the money storage device managing system 60 concerning the locked state releasing instruction signal, the money storage device managing server 30 updates the money storage device managing information and sets the state of the money storage device 100 to "unlocked" (step S401).

Upon setting the state of the money storage device 100 to "unlocked," the money storage device managing server 30 transmits a money take-in unit lock instruction signal to the money storage device 100 (step S402).

Upon receiving the money take-in unit lock instruction signal (step S403), the money storage device 100 locks the money take-in unit 15 (step S404).

Upon locking the money take-in unit 15, the money storage device 100 determines whether the electronic lock (the lock unlocked by receiving the locked state releasing instruction signal) in the lock unit 17 has been locked and thereby brought into the "locked state" (step S405).

When the money storage device 100 has determined that the electronic lock is in the locked state (Y in step S405), the money storage device 100 transmits a money take-in unit lock releasing request to the money storage device managing server 30 (step S406).

Upon receiving the money take-in unit lock releasing request (step S407), the money storage device managing server 30 updates the money storage device managing information from "unlocked" to "locked" (step S408), and transmits a money take-in unit lock releasing instruction signal to the money storage device 100 (step S409).

Upon receiving the money take-in unit lock releasing instruction signal (step S410), the money storage device 100 releases the lock of the money take-in unit 15 (step S411) and brings the money take-in unit 15 into a state in which the money take-in unit 15 can take in money.

As described heretofore, in the above-described embodiment, the money storage device 100 which stores money collected from customers is configured to conduct wireless communication (for example, communication using the communication network 40). In addition, the money storage device 100 is configured to receive the locked state releasing instruction signal for releasing the locked state from a server which can communicate with the money storage device 100 (for example, the money storage device managing server 30), and release the locked state in response to reception of the locked state releasing instruction signal. As a result, it becomes possible to conduct, in a remote place, unlocking management of the money storage device. Consequently, the security function can be further strengthened.

In other words, unless the instruction signal for releasing the locked state is received from the server that manages the money storage device, unlocking cannot be done. The worker who conducts money collection cannot touch collected money. No one except the manager who manages collected money can touch the collected money. Owing to such a configuration, it becomes possible to implement highly reliable money management.

Furthermore, the money storage device 100 in the above-described embodiment is configured to identify the own position, and transmit the own position information indicating the identified own position to the money storage device managing server 30. In addition, the money storage device 100 is configured to receive the locked state releasing instruction signal, which is transmitted when the own position indicated in the transmitted own position information is included in the specific area, from the money storage device managing server 30. As a result, the money storage device cannot be opened except at a specific position. Accordingly, it becomes possible to manage the collected money more strictly by setting a place where only the manager of money can enter as the specific position.

Furthermore, in the money storage device managing system 60 in the above-described embodiment, the money storage device managing server 30 is configured to transmit the locked state releasing instruction signal to the money storage device 100, update the money storage device managing information to "unlocked" indicating the unlocked state, and transmit the money take-in unit lock instruction signal. In addition, the money storage device managing server 30 is configured to receive the money take-in unit lock releasing request, update the money storage device managing information to "locked" indicating the locked state, and transmit the money take-in unit lock releasing instruction signal. The money storage device 100 is configured to receive the money take-in unit lock instruction signal, lock the money take-in unit 15, and determine whether the money storage device 100 is in the locked state. In addition, the money storage device 100 is configured to transmit the money take-in unit lock releasing request when the money storage device 100 is in the locked state, receive the money take-in unit lock releasing instruction signal, and release the lock of the money take-in unit 15. As a result, the state of the money storage device becomes either the "locked state" or the "lock state" without fail. When collecting money, therefore, it becomes possible to prevent the money storage device from going rounds to collect money in a state in which the money storage device is unlocked certainly.

By the way, although not especially mentioned in the above-described embodiment, a mechanical lock such as, for example, a pin tumbler lock can be used in the lock unit 17. For example, the lock unit 17 can be configured "to prevent a key from being inserted in a state in which the locked state releasing instruction signal is not received" or "to prevent a cylinder or a cam from rotating even if a key is inserted in a state in which the locked state releasing instruction signal is not received." According to such a configuration, it becomes possible to release a system of a locking mechanism in which the system is locked and unlocking is impossible. As a result, it becomes possible to conduct double locking, i.e., releasing of the system lock and releasing of the locking mechanism. Consequently, the security function can be further strengthened.

Furthermore, it is also possible to use an electronic lock such as use of an encryption key. For example, the lock unit 17 can be configured "to become capable of being unlocked only when the locked state releasing instruction signal and the encryption key coexist" or "to prevent a power supply from being turned on and prevent the encryption key from being input in a state in which the locked state releasing instruction signal is not received." According to such a configuration, it becomes possible to release a system of a locking mechanism in which the system is locked and unlocking is impossible. As a result, it becomes possible to conduct double locking, i.e., releasing of the system lock and releasing of the locking mechanism. Consequently, the security function can be further strengthened.

Furthermore, although not especially mentioned in the above-described embodiment, the control unit 11 may be configured to provide an upper limit on stored money. In other words, the control unit 11 may be configured to store sum of paying-in amounts from customers and not to receive paying-in when the sum total of paying-in amounts has exceeded a previously set numerical value. According to such a configuration, management can be conducted to prevent the sum total of stored money from becoming a large sum, and consequently it becomes possible to conduct risk management. Furthermore, according to such a configuration, it becomes possible to manage a maximum amount of an amount of stored money, resulting in a lightened load when carrying.

Furthermore, although not especially mentioned in the above-described embodiment, the money storage device 100 may be configured to include an explosion device, activate the explosion device and cause explosion when unlocking is attempted forcibly although the locked state releasing instruction signal is not received. For example, the money storage device 100 may be configured to include special ink such as color ink in the money storage unit 16 and cause the special ink to adhere to stored bills by rupture. According to such a configuration, even in a case where money is plundered, the money proves to be plundered money at a glance. As a result, it becomes possible to bring about a state in which the plunderer cannot use the plundered money.

INDUSTRIAL APPLICABILITY

The present invention is useful in providing a money storage device configured to collect money while going rounds of resident places of customers.

REFERENCE SIGNS LIST

11 Control unit
12 Customer information read unit
13 Display unit
14 Operation reception unit
15 Money take-in unit
16 Money storage unit
17 Lock unit
18 Own position identification enabling information acquisition unit
19 Wireless communication unit
20 Storage unit
30 Money storage device managing server

60 Money storage device managing system

100 Money storage device

The invention claimed is:

1. A money storage device which stores collected money, the money storage device comprising:

a receiver configured to receive a locked state releasing instruction signal, which instructs to release a locked state of the money storage device, from a server, which manages the money storage device, via a communication network by using wireless communication;

a lock configured to release the locked state of the money storage device in response to receiving the locked state releasing instruction signal; and a money intaker configured to take in money deposit according to a state of locking of the money storage device, wherein the money storage device is portable, and a mobile deposit of the money is available when the money storage device is in the locked state, and the mobile deposit of the money is not available when the money storage device is in an unlocked state.

2. The money storage device according to claim 1, further comprising a transmitter configured to transmit position identification enabling information of the money storage device, which enables identification of a position of the money storage device, to the server, wherein the receiver receives the locked state releasing instruction signal, which is transmitted by the server when the position of the money storage device identified by using the position identification enabling information is included in a specific unlocking permission area.

3. The money storage device according to claim 1, further comprising:

a processor configured to identify customer information, and to convert an amount of money taken in by the money intaker to points;

a memory configured to store paying-in managing information obtained by associating points converted with the customer information; and a transmitter configured to transmit the paying-in managing information to the server.

4. A money storage device managing system comprising a money storage device configured to store collected money and a server configured to manage the money storage device, wherein the money storage device includes a receiver configured to receive a locked state releasing instruction signal, which instructs to release a locked state of the money storage device, from the server, via a communication network by using wireless communication, a lock configured to release the locked state of the money storage device in response to reception of the locked state releasing instruction signal, and a money intaker configured to take in money deposit according to a state of locking of the money storage device, the money storage device is portable, the server includes a transmitter configured to transmit the locked state releasing instruction signal to the money storage device, and a mobile deposit of the money is available when the money storage device is in the locked state, and the mobile deposit of the money is not available when the money storage device is in an unlocked state.

5. The money storage device managing system according to claim 4, wherein the money storage device further includes a transmitter configured to transmit position identification enabling information of the money storage device, which enables identification of a position of the money storage device, to the server, the server further includes a memory configured to store unlocking permission area information, which indicates an unlocking permission area where unlocking the locked state is permitted, and a processor configured to determine whether the position of the money storage device indicated by the position identification enabling information is included in the unlocking permission area indicated by the unlocking permission area information, and the transmitter of the server transmits the locked state releasing instruction signal to the money storage device when the processor has determined that the position of the money storage device is included in the unlocking permission area.

6. The money storage device according to claim 2, comprising:

a processor configured to identify customer information, and to convert an amount of money taken in by the money intaker to points; and a memory configured to store paying-in managing information obtained by associating points converted with the customer information, wherein the transmitter is further configured to transmit the paying-in managing information to the server.

* * * * *